United States Patent
Dunn

(10) Patent No.: US 8,462,464 B1
(45) Date of Patent: Jun. 11, 2013

(54) HIGH STRENGTH FLYING LEADS FOR MULTI-LAYER FLEXURE DESIGNS

(75) Inventor: Christopher Dunn, Austin, TX (US)

(73) Assignee: Magnecomp Corporation, Murrieta, CA (US)

( * ) Notice: Subject to any disclaimer, the term of this patent is extended or adjusted under 35 U.S.C. 154(b) by 220 days.

(21) Appl. No.: 12/951,020

(22) Filed: Nov. 20, 2010

Related U.S. Application Data

(60) Provisional application No. 61/264,116, filed on Nov. 24, 2009.

(51) Int. Cl.
G11B 5/48 (2006.01)

(52) U.S. Cl.
USPC ................................................ 360/245.9

(58) Field of Classification Search
USPC .................. 360/244.3, 245.3, 245.8, 245.9
See application file for complete search history.

(56) References Cited

U.S. PATENT DOCUMENTS

| | | | |
|---|---|---|---|
| 5,687,479 A | 11/1997 | Bennin et al. | |
| 5,694,270 A | 12/1997 | Sone et al. | |
| 5,717,547 A | 2/1998 | Young | |
| 5,883,759 A | 3/1999 | Schulz | |
| 6,399,899 B1 | 6/2002 | Ohkawa et al. | |
| 7,142,395 B2 * | 11/2006 | Swanson et al. | 360/245.9 |
| 7,301,729 B2 | 11/2007 | Wada et al. | |
| 7,342,750 B2 * | 3/2008 | Yang et al. | 360/245.9 |
| 7,388,733 B2 * | 6/2008 | Swanson et al. | 360/245.9 |
| 7,466,519 B2 | 12/2008 | Wakaki et al. | |
| 7,518,830 B1 | 4/2009 | Panchal et al. | |
| 7,813,082 B2 * | 10/2010 | Rice et al. | 360/245.9 |
| 2006/0163078 A1 | 7/2006 | Peter | |

* cited by examiner

*Primary Examiner* — Angel Castro
(74) *Attorney, Agent, or Firm* — Intellectual Property Law Offices of Joel Voelzke, APC

(57) ABSTRACT

A multi-layer circuit such as for a disk drive suspension has two regions: a supported region in which first and second stacked signal conductors are supported on a stainless steel support layer and an insulating layer, and an unsupported region having flying leads in which the flying leads are not supported below by the support layer. The two stacked signal conductors are formed by two separate plating operations, the two plating operations simultaneously creating the flying leads and the unsupported portions of the signal conductors, such that the flying leads have thicknesses that are the sum of the thicknesses of the individual conductors. Crossbars and vias allow the different plating layers to be connected together. This construction allows the individual conductors to be relatively thin and flexible for good electrical and mechanical performance, while creating relatively thick flying leads that are resistant to handling damage.

26 Claims, 4 Drawing Sheets

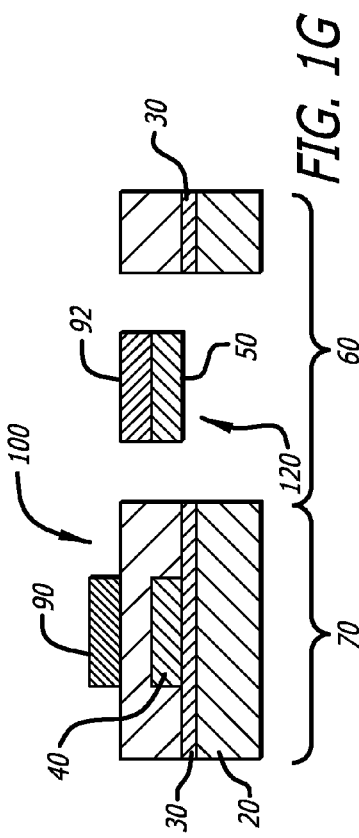
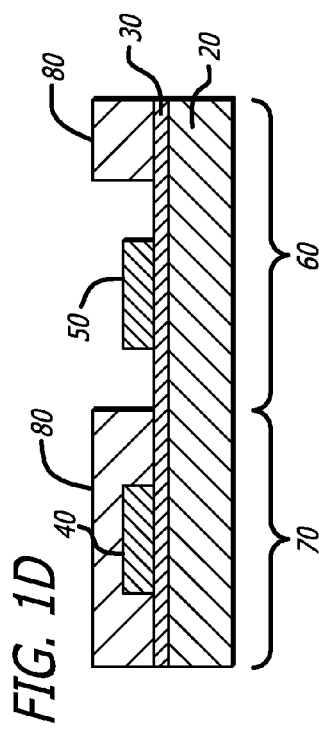
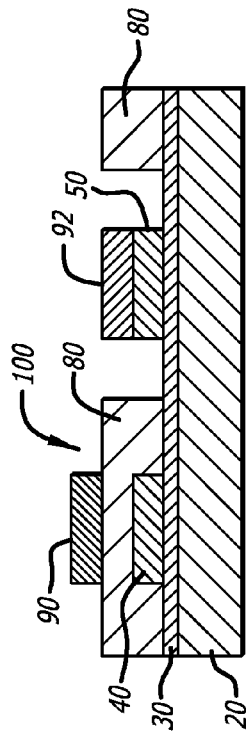
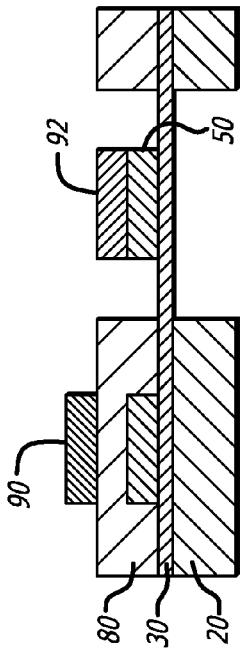
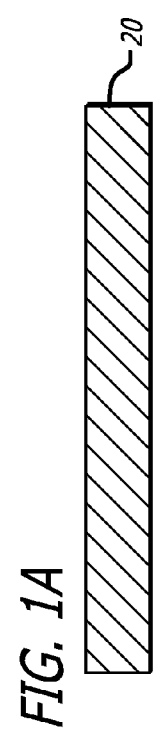
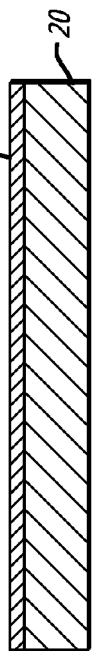
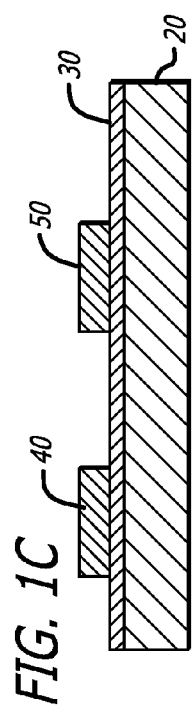

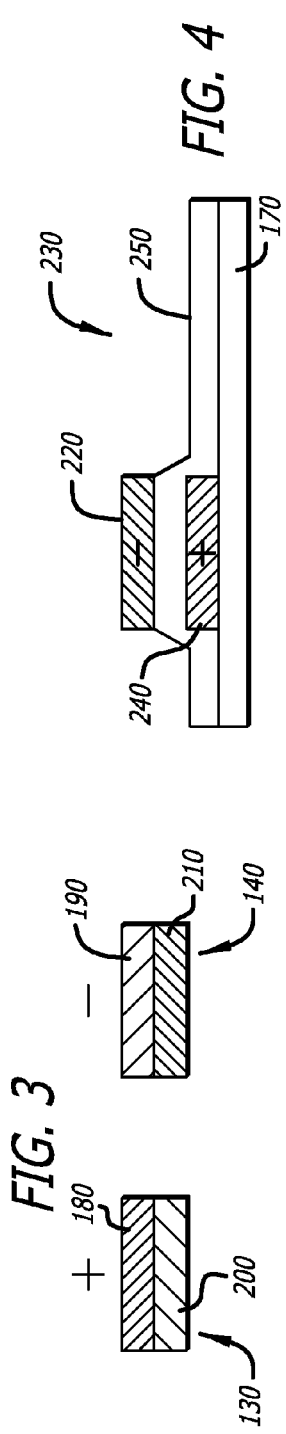
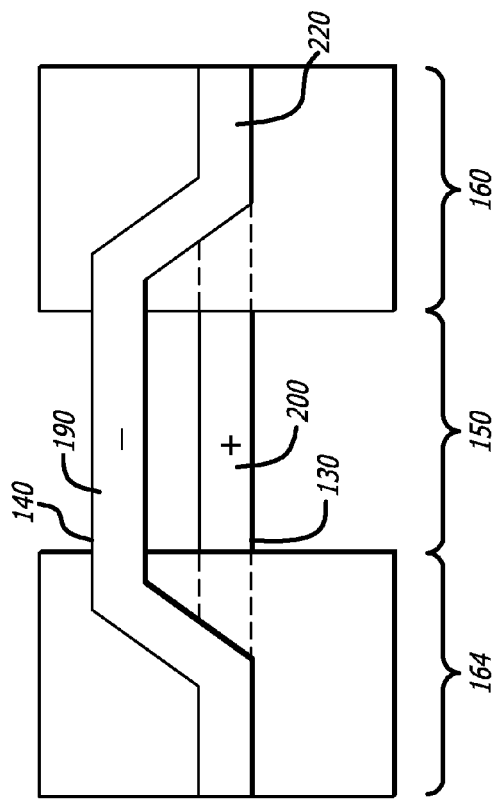
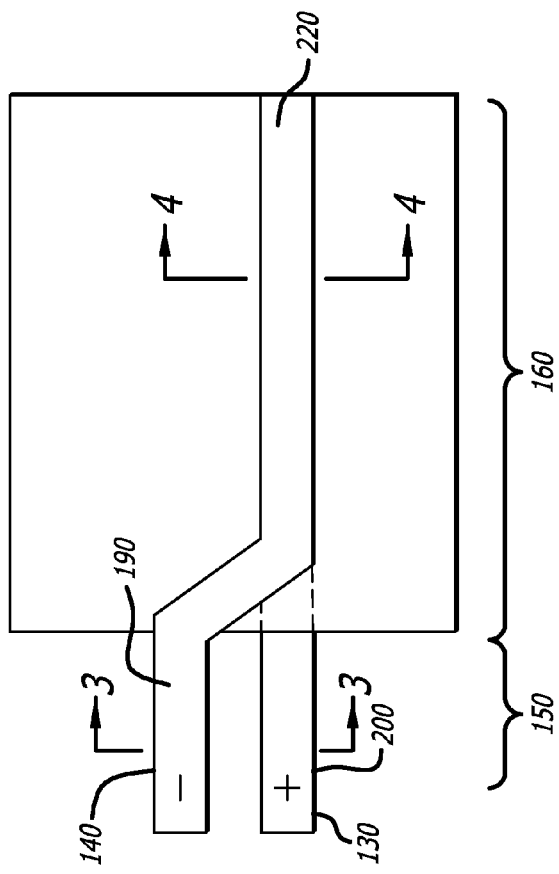

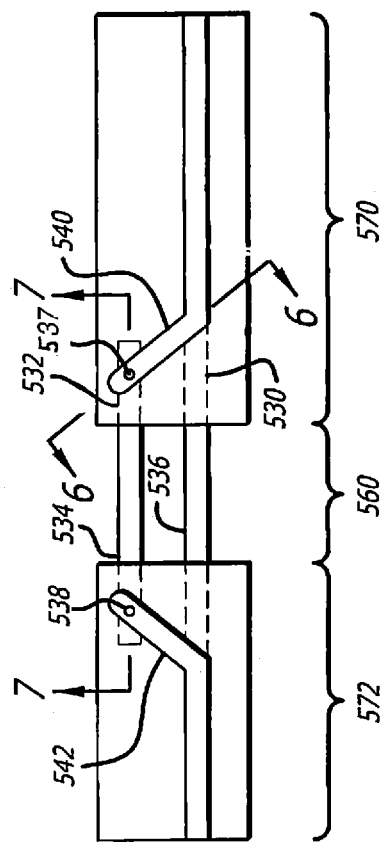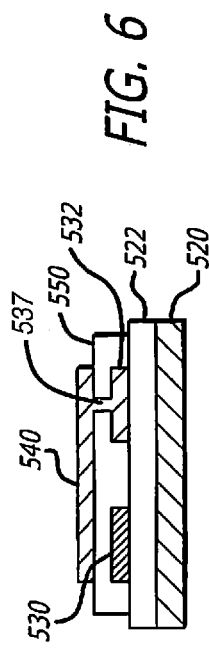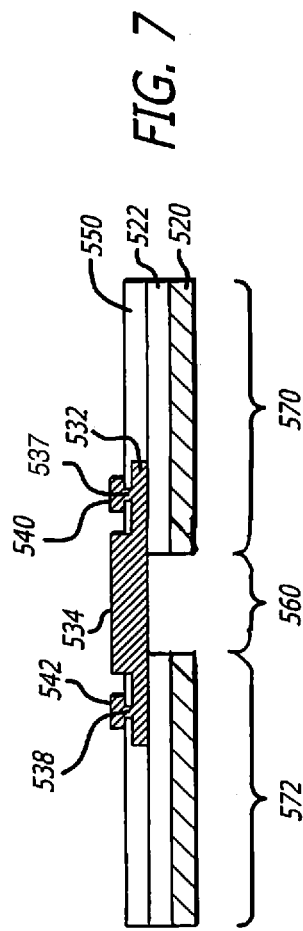

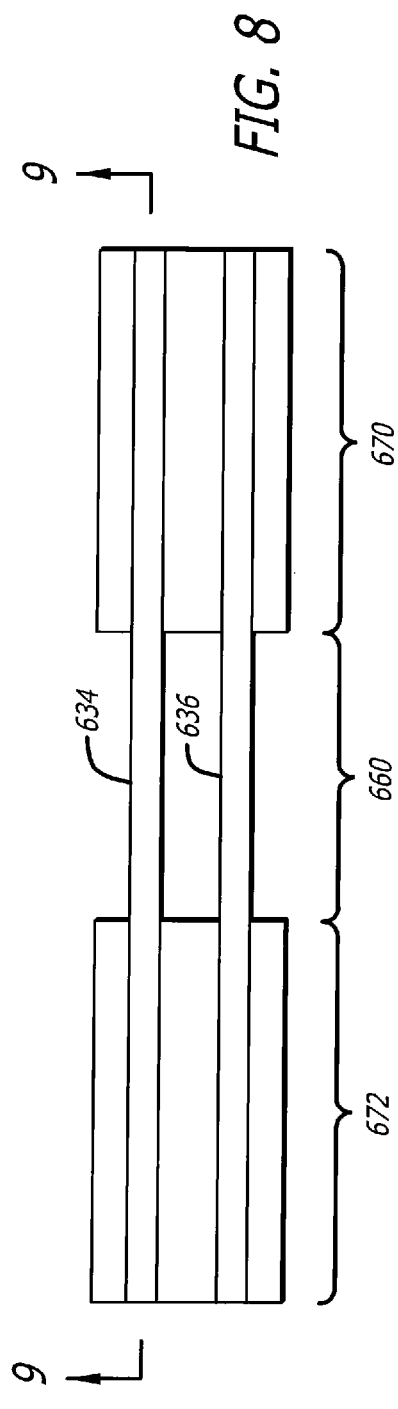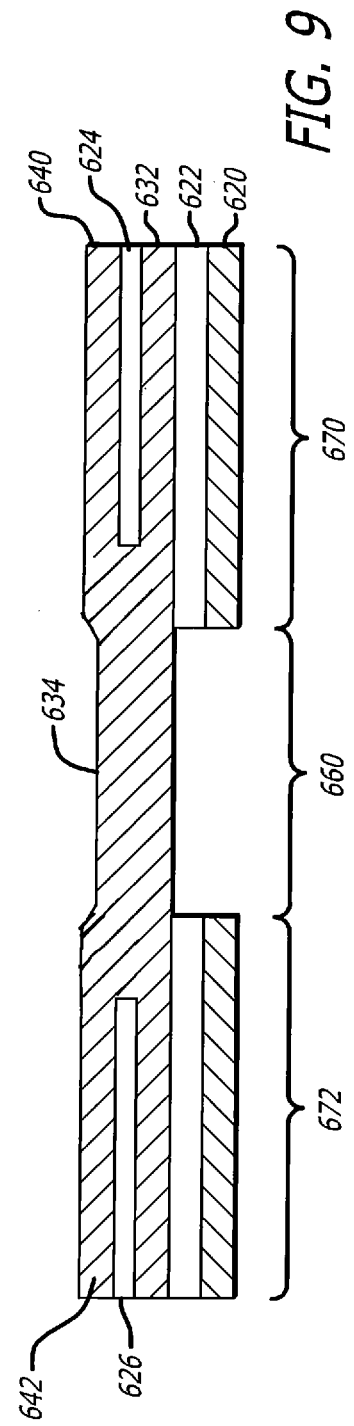

HIGH STRENGTH FLYING LEADS FOR MULTI-LAYER FLEXURE DESIGNS

RELATED APPLICATIONS

This application claims benefit of U.S. Provisional Patent Application No. 61/264,116 filed Nov. 24, 2009, which is hereby incorporated by reference as if set forth in its entirety herein.

BACKGROUND

Disk drive suspension interconnects for hard disk drives typically have three layers, namely, a stainless steel foil (a spring metal layer) which provides mechanical properties for the suspension, two or more conductive signal traces which provide electrical connection between the read/write head slider and the termination pads of the suspension, and a dielectric layer which provides electrical insulation between the stainless steel foil and the conductive traces. The stainless steel foil acts as a support layer for the dielectric layer and the conductive traces. The suspension interconnect defines a flexible electrical circuit.

Suspension circuits commonly have termination pads at the ends of the circuits located on flying or unsupported metallic conductors. Such unsupported metallic conductors are typically referred to as "flying leads." Examples thereof are disclosed in U.S. Pat. No. 7,468,866 issued to Yang, et al.; in U.S. Patent Publication No. U.S. Patent Application Publication No. 2006/0163078 by Peter; and in copending application Ser. No. 12/540,870, filed Aug. 13, 2009 and entitled "Resilient Flying Lead and Terminus for Disk Drive Suspension."

One purpose of the flying lead region is to provide access to both surfaces of the conductive lead. The flying leads typically terminate at three locations. Electrical contacts to the flying leads are made using various methods common to microelectronics packaging. The most prevalent termination practices relative to location are: solder ball bonding when terminating to the read-write head; conductive epoxy when terminating to a PZT in a dual stage actuated suspension; and thermosonic bonding at the input/output terminations near the primary actuator. The flying leads have metallic conductors that are unsupported by the dielectric layer that normally separates the conductive signal traces from the other conductive layers and the substrate or support layer, such as the stainless steel foil. The flying leads therefore typically lack the stiffness provided by the underlying dielectric layer and stainless steel layer. The flying leads may be supported by dielectric or other materials on opposing sides of the span, or in the case of read-write terminations may be of a cantilevered configuration and be supported from a single side.

FIG. 2 in U.S. Pat. No. 7,142,395 (Swanson) shows a flying lead region 50. The flying leads are over portions of the tail that are free of the spring metal base. In particular, Swanson shows a test pad portion 46, for example, on the side of the flying leads away from the suspension. Such a test pad portion is typically used to test the completed suspension assembly. If it is found that a read-write head (also referred to as a slider) on a suspension assembly is defective, the head is replaced by parting the flexure tail bond and replacing the head. On the other hand, if the read/write head passes the tests, the test pad portion is cut off and the suspension is integrated into a completed disk drive unit. Swanson discloses methods of manufacturing integrated lead head suspension flexures of the type having conductors on a spring metal layer and having a flying lead region.

FIGS. 6, 8, and 12, for example, of Swanson show a multi-layered flying lead region. Swanson at col. 5, lines 25-27 discloses that the flying lead region of the conductive lead may be wider than other portions of the conductive lead. Additionally, FIGS. 15, 16, 17, 18 and 19, for example, show flying lead regions with alternative reinforcement members.

During the disk drive manufacturing process, the flying leads can be used for test purposes, as mentioned above and as is also discussed in U.S. Pat. No. 7,110,222 (Erpelding). In particular, Erpelding describes integrated lead suspensions and tail pad terminations of those suspensions. The tail pads can be electrically connected via soldering or thermosonic bonding.

U.S. Pat. No. 5,666,717 (Matsumoto) discloses a number of processes, such as cladding, sputtering, vacuum deposition and ion plating, which can be used to manufacture flexures.

U.S. Pat. No. 7,518,830 (Panchal et al.) discloses a flying lead 53 in FIG. 3. The flexure of Panchal has traces on both sides of the spring metal layer. The trace can be electrically connected together by a via that extends through the spring metal layer and the dielectric material. Panchal discusses multi-circuit flexure designs that purportedly reduce flexure width, minimize temperature and humidity effects on mechanical performance, and achieve higher electrical performance.

U.S. Pat. No. 5,883,759 (Schulz) discloses flying leads at reference numeral 54. The flying leads electrically connect the conductive traces to the contact pads of the magnetic head.

Fragile unsupported leads, and particularly flying leads, are prone to damage during assembly or testing or when separating the ultrasonic bonding terminal or solder bonding terminal for rework. In recent years, as the thickness of the copper conductor layer has decreased from about 12 μm to about 7 μm, the leads have become even more fragile, making rework even more difficult.

Stacked conductor configurations are also known, and an example thereof is disclosed in U.S. Pat. No. 5,883,759 (Schulz). Referring to the Abstract of Schulz, first and second conductive trace layers at least partially overlap one another and are sufficiently proximate to one another to reduce inductance of an electrical interconnect. The interconnect electrically connects a magnetic head and read/write circuitry in a disk drive.

Stacked sets of conductors are also disclosed in U.S. Pat. No. 5,587,479 (Bennin et al.) in the paragraph bridging columns 12 and 13 and in FIG. 14 thereof.

Stacked trace constructions, where two copper traces are separated by a thin polyimide layer, can exhibit improved electrical performance over non-stacked trace constructions. In a stacked trace configuration, the trace pairs are separate and not electrically connected. One trace carries a positive half of the signal (+) and the other trace carries a negative half of the signal (−). Stacking the two halves of a differential pair in this manner can reduce the transmission line impedance as compared to side-by-side conductors.

BRIEF SUMMARY

Disclosed herein are multi-layer flexures and similar related structures with flying leads having improved strength over flying leads of the prior art, and methods for making same. According to the invention, a first signal conductor such as copper is electrodeposited on a support of stainless steel and a first insulating layer such as polyimide. The first signal conductor includes both a supported portion that will remain supported by the stainless steel and the polyimide after all processing is finished, and an unsupported portion that will be unsupported after all processing is finished and will therefore become the flying lead. A second insulating layer is then laid down over the supported portion of the first conductor, and then a second signal conductor such as copper is laid down over the second insulating layer and the first conductor to form a stacked pair of conductors. At the same time as the second conductor is laid down over first conductor but electrically isolated from it, the plating deposits additional copper directly onto the unsupported portion or the flying lead portion. The stainless steel and polyimide are then etched away in the unsupported region to create the flying lead, i.e., the lead having no support layer underneath.

The result is a circuit having two separate stacked, supported conductors having approximately the same thickness (e.g., approximately 5-6 μm each), and an unsupported portion having double thickness (e.g., approximately 10-12 μm) flying leads. The thin stacked conductors, which would usually be stacked opposite polarities of a differential signal over a stainless steel foil that forms a ground plane, have desirable impedance characteristics for a microstrip transmission line, and also are thin and flexible which is highly desirable for a suspension circuit to allow the suspension gimbal to pitch and roll relatively freely. At the same time, the doubly thick flying lead has sufficient mechanical strength to prevent inadvertent damage during handling such as installation, test, and rework.

Alternatively, the two stacked conductors could be electrically connected, such that the two stacked conductors and the flying lead all carry the same signal. The result is that the supported region is thin and flexible which is desirable in a suspension circuit, while the flying lead is doubly thick for added mechanical strength in the area in which additional mechanical strength is needed due to the absence of the stainless steel support layer. This structure is an improvement over a flexure circuit in which the signal conductor has the same constant thickness in both the supported region and in the flying lead region.

Exemplary embodiments are further described below with reference to the drawings, wherein like reference numerals refer to like parts.

BRIEF DESCRIPTION OF THE DRAWINGS

FIGS. 1A-1G illustrate a multi-circuit layer additive process of the present disclosure for forming a flexure or similar structure having improved flying lead features.

FIG. 2A is a top plan view of a flexure or similar structure having improved flying lead features and cantilevered terminations, and which can be made, for example, by the additive process of FIGS. 1A-1G or similar processes as would be apparent to those skilled in the art from this disclosure.

FIG. 2B is a top plan view of structure that is similar to FIG. 2B except that instead of having cantilevered terminations, the flying leads transition back to non-flying leads.

FIG. 3 is an enlarged cross-sectional view taken along section line 3-3 of FIG. 2A and illustrates the double-plated flying leads thereof in greater detail.

FIG. 4 is an enlarged cross-sectional view taken along section line 4-4 of FIG. 2A and illustrates the stacked trace configuration thereof in greater detail.

FIG. 5 is a top plan view of a flexure or similar structure having improved flying leads according to an embodiment of this disclosure.

FIG. 6 is cross-sectional view of the flexure of FIG. 5 taken along section line 6-6.

FIG. 7 is cross-sectional view of the flexure of FIG. 5 taken along section line 7-7.

FIG. 8 is a top plan view of a flexure or similar structure having improved flying leads according to another embodiment.

FIG. 9 is a cross-sectional view of the flexure of FIG. 8 taken along section line 9-9.

DETAILED DESCRIPTION

Process steps for forming a multi-circuit layer structure of this disclosure having one or more strong flying leads are illustrated in FIGS. 1A-1G and will now be discussed.

FIG. 1A shows a support layer 20, such as a stainless steel foil, on which a first dielectric coating 30, and which defines a first insulating layer, is applied, as depicted in FIG. 1B. A first circuit plating step is illustrated in FIG. 1C to form two conductors 40, 50 on the dielectric coating. The conductors are typically pure copper or copper alloy.

In order to plate copper onto an insulating material such as polyimide, first a tie layer of chromium or possibly Monel metal may be deposited onto the polyimide by sputtering, followed by a sputtered copper seed layer, possibly followed by a flash plated copper later. The remainder of conductors 40 and 50 may be then be deposited by electrodepositing copper over the sputtered copper seed layer. Such techniques are discussed in greater detail in U.S. Pat. No. 7,781,679 issued to Schreiber et al. which is assigned to the assignee of the present invention, and which is incorporated herein by reference in its entirety. That patent also discloses techniques for creating metallized vias through insulating layers such as polyimide in order to create electrical connections between different circuit layers. The teachings of that patent are applicable to the present invention, and are incorporated herein by reference as if fully set forth herein. For simplicity of discussion, those teachings will not be discussed in further detail with reference to the present invention, but it will be understood that those teachings and techniques are applicable to the present invention and provide details as to process steps that are discussed herein in general terms.

Conductor 50 is in what will become the flying lead region, or unsupported region, 60, and conductor 40 is in the non-flying lead region, or supported region, 70. Application of a second dielectric coating 80 on the non-flying lead regions is shown in FIG. 1D. The dielectric coating material can be polyimide, and conductors 40, 50 can be copper.

A second circuit plating step is illustrated in FIG. 1E to form a third conductor 90 above conductor 40 with a portion of the second dielectric coating 80 therebetween. This forms a stacked lead (or conductor or trace) configuration (or construction) as shown generally at 100. At the same time that the third conductor 90 is plated, conductor 50 in flying lead region 60 is plated with a second layer 92 of copper.

Referring to FIG. 1F, the portion of the stainless steel layer 20 in the flying lead region 60 is then etched away. Next, the portion of the first dielectric coating 30 in the flying lead region is etched away, as shown in FIG. 1G. A double-plated and therefore doubly thick flying lead 120 extending across the flying lead portion is thereby formed.

From one perspective, the structure of FIG. 1G defines a multi-layer flexure, the flexure having a supported region 70 and an unsupported region 60. Supported region 70 includes a support layer 20 such as stainless steel foil, an insulating layer 30 such as polyimide on support layer 20, and a supported portion of a first signal conductor 40 carrying a first signal and a supported portion of a second signal conductor 90 carrying a second signal, the supported portion being disposed over and supported by insulating layer 30 and support layer 20, and with the two signal conductors being electrically separated from one another by second insulating layer 80. The two signal conductors 40 and 90 are disposed one above the other in stacked fashion as to form stacked leads. Typically, stainless steel support layer 20 is grounded such that support layer 20 is also a ground layer that defines a ground plane, such that the supported portion 70 includes two vertically stacked conductors 40, 90 over a ground plane. A flying lead region 60 includes a flying lead which is defined by the two plated conductor layers 50 and 92 taken together, and has no support layer underneath it. The flying lead 50/92 is significantly thicker than either of conductors 40 and 90 in supported region 70. More specifically, flying lead 50/92 is at least 50% thicker than either of the conductors 40 or 90 in supported region 70, and more specifically still, flying lead 50/92 is approximately twice as thick as either conductor 40 or conductor 90, and has a thickness that is approximately equal to the sum of the respective thicknesses of conductors 40 and 90. As will be explained further below, the two conductors 40, 90 can either carry the same signal as flying lead 50/92 and be electrically continuous and integral with that flying lead, or exactly one of conductors 40, 90 can be electrically continuous with flying lead 50/92 and be electrical continuous and integral with that flying lead. If the two signals conductors 40, 90 carry different signals, those two different signals can be two opposite polarities of a single differential signal, e.g., the Write+ and Write– halves of a differential Write signal to the transducer head.

Two double-plated flying leads extending across the through-opening of the flying lead portion are shown in FIGS. 2A and 3 and discussed below. There can also be locations where a hole can be left in the polyimide separating the two copper layers and the second layer plated within the hole to create a micro-via between the copper layers, as discussed more fully in U.S. Pat. No. 7,781,679 issued to Schreiber et al.

FIGS. 2-4 illustrate how a standard flying lead design of a differential pair can transition to a stacked trace configuration pursuant to this disclosure. Two double-plated and cantilevered flying leads 130, 140 are shown in these drawing figures, extending over a flying lead region 150, and transitioning to a flexible circuit portion 160, of suspension substrate 170. Each flying lead has two metal top portions 180, 190 which define respective top layers, and two metal bottom portions 200, 210 which define respective bottom layers, where the two bottom layers can be formed in a first electrodeposition process step, and the two top layers can be formed in a second process electrodeposition process step.

As best depicted in FIG. 2A, the top layer 190 of double-plated flying lead 140 becomes the top trace 220 in the stacked trace configuration, which is shown in enlarged detail in FIG. 4 generally at 230. The bottom layer 200 of double-plated flying lead 130, as shown in FIG. 3, continues straight to become the bottom trace 240 of the stacked trace configuration 230. A polyimide layer 250 is sandwiched between the traces, as shown in FIG. 4.

The double-plated flying leads 130, 140 define cantilevered leads, and could have respective contact pads thereon for bonding such as thermosonic bonding. The flying leads combine on the right side of FIG. 2A into a stacked trace configuration, such as that depicted in FIG. 4. A further alternative is that the double-plated flying leads separate to form four traces extending to the left of FIG. 2A. While two double-plated flying leads 130, 140 are shown in FIG. 2A, another embodiment has a single flying lead, and other embodiments can have more than two flying leads, such as four flying leads, for the flexure.

FIG. 2B is a top plan view of structure that is similar to FIG. 2B except that instead of having cantilevered terminations, the flying leads 130, 140 in flying lead region 150 transition to non-flying leads on both the right and left sides, in first and second flexible circuit portions 160, 164, respectively.

FIG. 5 is a top plan view of a portion of a flexible circuit for a disk drive suspension or similar structure having improved flying leads of this disclosure. This figure and FIGS. 6 and 7, which are cross-sectional views of the same embodiment taken along section lines 6-6 and 7-7, respectively, illustrate the structure of the circuit as the copper conductor traces transition from stacked halves of a differential signal pair within first supported circuit section 570, to two double-thickness flying leads 534 and 536 within the flying lead section, or unsupported region, 560, then back to stacked halves in second supported circuit section 572.

The circuit sections include a stainless steel substrate 520, an insulative layer 522 such as polyimide, and a bottom copper conductor layer including copper conductors 530 and 532, covered by a second insulative layer 550. On top of insulative layer 550 is a top copper conductor layer including conductor 540. In the right half of circuit section 572, the conductors on the top and bottom copper conductor layers are stacked, i.e., they constitute two single-thickness conductors, one stacked on the other, carrying the minus and plus signal halves, respectively, of a differential signal pair such as a Write– and a Write+ signal. As discussed previously, the stacking of conductors in this manner reduces the impedance of the signal transmission line. For discussion purposes, the first or bottom conductor 530 will be assigned as being the "plus" trace and the second or top conductor 540 as being the "minus" trace, and the signal will be treated as traveling from right to left as viewed in FIG. 5.

As illustrated in FIGS. 5 and 6, minus trace conductor 540 begins parting ways with plus trace conductor 530 underneath it by angling upward and toward the left in FIG. 5. This angled portion of conductor 540 defines a crossbar or cross connection. Minus conductor 540 electrically communicates with bottom level conductor 532 through a via 537 formed in the polyimide and filled with conductive material, preferably simply the same copper laid down during the electrodeposition step in which top copper conductor 540 is deposited. At this point, instead of the plus and minus signals being stacked on top of each other, they are disposed side-by-side in parallel.

As illustrated in FIG. 7, bottom layer conductor 532 continues into flying lead section 560 and becomes first flying lead 534. Flying lead 534 has a double thickness, that is, a thickness that is equal to the thickness of bottom copper conductor layers 530 and 532 plus the thickness of top copper conductor 540.

Second flying lead 536 carrying the plus half of the signal is also a double thickness flying lead, having been plated at the same times and to the same thickness as first flying lead 534. The difference between the two flying leads is that second flying lead 536 represents merely a continuation of copper conductor 530 out past the end of stainless steel substrate 520 and polyimide 550, with the conductor then being plated a second time to give it a double thickness, without transitioning from one vertical layer to another through vias.

When the signal reaches the second circuit section 572, flying leads 534 and 536 transition back to two stacked conductors, in a manner that can be the mirror image of FIG. 6. More specifically, the minus signal in flying lead 534 travels into the bottom level copper conductor in second circuit section 572, up through via 538 to top level copper conductor 542, and along top level copper conductor 542 until that conductor is traveling once more over the plus signal which is carried by the bottom copper layer.

In the embodiment of FIGS. 5-7, therefore, two different conductors which define two different signal paths travel in stacked fashion over a ground plane in a supported region 570, then transition by a crossbar 540 and via 537 to travelling side by side as parallel flying leads 534, 536 in a flying lead region 560 in which the conductors are unsupported, then transition by a via 538 and crossbar 542 back to travelling in stacked fashion over a ground plane in a second supported region 572, with two different supported regions 570, 572 lying on opposite sides of the flying lead region 560. The two stacked conductors and the two flying leads define respective first and second signal paths that are electrically isolated from one another.

With reference to FIGS. 1A-1G and thus the process for making the flexure circuit shown in FIGS. 5-7, flying lead 536 and associated bottom signal conductor 530 form a first signal path. Flying lead 534 and associated top signal conductor 540 form a second signal path. Bottom signal conductor 530 was deposited as part of a bottom electroplated layer, and top signal conductor 540 was deposited as part of a top electroplated layer. The two electroplated layers are separated by insulative layer 550 within most of the supported regions 570 and 572. In the flying lead region 560, flying leads 534 and 536 are each formed by respective parts of the top electroplated layer being deposited on respective parts of the bottom electroplated layer, so as to form two double thickness flying leads.

FIG. 8 is a top plan view of part of a flexure or similar structure having improved flying leads according to another embodiment. FIG. 9 is a cross-sectional view of the flexure of FIG. 8 taken along section line 9-9. According to this embodiment, the two halves of a differential signal pair are not stacked. Rather, the plus and minus signals travel in parallel. In this sense, the flexure is similar to conventional flexures having non-stacked signals. The non-conventional aspect of this flexure is that for each of the circuit sections 670 and 672, the copper conductor carrying a single signal or single polarity is split into two single-thickness halves, namely, a single thickness top conductor and a single thickness bottom conductor, e.g., 640 and 632, respectively, in first circuit section 670, and 642 and 632 in second circuit section 672; and each flying lead 634 and 636 has a double thickness. The stacked conductors are separated by insulative layers 624 and 626 such as polyimide. The double thickness flying leads 634, 636 have the strength provided by the double thickness copper, typically approximately 12 µm, to prevent damage during suspension handling.

A primary advantage to this configuration over having 12 µm thick copper traces in both the circuit regions 670 and 672 and the flying lead region 660 is that by splitting the 12 µm thickness of copper into two 6 µm traces, the stiffness attributable to the copper traces is reduced as compared with a 12 µm copper trace. That is, two 6 µm copper traces separated by a thin polyimide layer are more flexible than a single 12 µm copper trace. This is due to the fact that the strength of a beam is proportional to the cube of its thickness. Thus, two single-thickness beams taken together will be more flexible than a single double-thickness beam. In this way, a flexure made according to this embodiment will enjoy the advantages of flexibility in the circuit regions 670 and 672, as well as enhanced strength of the otherwise fragile flying leads 634 and 636. Flexibility is particularly important in the gimbal region of a suspension circuit, so that the gimbal which carries the head slider can freely roll, pitch and yaw over the spinning disk surface.

In all of these embodiments, a protective topcoat can be applied over the top of the entire circuit except in the flying lead regions. For simplicity of illustration, the protective topcoats are not shown in the figures. Protective topcoats for suspension circuits and other types of circuits are well known in the art and need not be discussed further.

The single and multi-circuit layer flexure structures (and manufacturing methods) of the present disclosure are improvements over designs such as in the above-mentioned Panchal patent. They are improvements because while flexures of the present disclosure have thin copper layers (e.g., $\leq 10$ µm) in the non-flying lead regions, the flying leads, e.g., 130, 140, are doubly thick which makes them significantly stronger than if they had only the same thickness as the signal traces in the non-flying lead regions. This helps to prevent the normally fragile flying leads from breaking during normal processing and handling particularly during rework.

In other words, according to the present disclosure, a flexure and its flexible circuit can have parallel side-by-side flying leads that are plated twice in each of two separate copper plating steps of about 5-6 µm thickness each, thus creating a flying lead having a total copper thickness of about 10-12 µm. At the same time, another part of the flexible circuit has stacked leads of approximately 5-6 µm thickness each. In this way, the flying lead region is thick enough to protect against damage to the flying leads and thus minimize yield loss, while at the same time the stacked trace area of the circuit is thin enough to minimize stiffness impact of the stacked trace layers on the gimbal.

The total thickness of the flying leads 130, 140 will be the combined thickness of the two copper plated layers 220, 240. Thus, for example, if both of the copper layers 220, 240 are each plated to 5 µm depth, the flying lead thickness will be 10 µm. Alternatively, the layers can be plated to different thicknesses. For example, if one layer is 3 µm and the other is 6 µm, then the flying lead thickness will be 9 µm.

An example of a stacked differential pair known in the prior art is disclosed in U.S. Pat. No. 5,694,270 (Sone et al.); see, e.g., Sone et al. FIG. 3B and the claims. According to Sone, this arrangement allows for narrower signal traces, so that the circuit is not too wide for the space into which it needs to fit, without making the resulting impedance too high.

The embodiments disclosed herein enable multi-circuit layer structures similar to those of Shone to have thin copper trace layers (having thicknesses on the order of 3-7 µm), while having flying leads with improved mechanical strength. The improved mechanical strength is due to their thicknesses, which can be generally on the order of 10-12 µm, generally twice the thickness of the copper trace layers. More specifically, today's flexure manufacturers can produce single layer flexures with flying leads with 10-12 µm thicknesses with acceptable strength to survive suspension processing and handling. By using the constructions and manufacturing processes disclosed herein, the copper layer thicknesses can be reduced to 5-6 µm, while the flying leads have a strength similar to that of single layer 10-12 µm flying leads, as also mentioned above.

It is within the scope of the invention that the stacked conductors could be crossed over each other multiple times, each crossover using crossbars and vias similar to crossbars 540, 542 and vias 537, 538 in FIG. 7, to form a "twisted pair" construction. The twisted pair can be a "flat" twisted pair or a "stacked" twisted pair. Examples of "twisted pairs" are disclosed in copending U.S. application Ser. No. 12/623,983 filed Nov. 23, 2009, and entitled, "Low Impedance, High Bandwidth Disk Drive Suspension Circuit." Examples of vias are shown in Panchal at reference numeral 282 and in copending application Ser. No. 12/540,870 at reference numerals 24, 224 and 225.

Different conductors and different signal paths have been spoken of herein as being "electrically isolated" from one another. Of course, it will be understood that the term "electrically isolated" and similar terms are relative terms, and that there is always at least some negligibly small conductance from one point to another point. Additionally, sometimes a small amount of conductance from a signal path to ground is intentionally introduced in order to allow electrostatic charges from building up to the point of electrostatic discharge which could cause catastrophic failure of sensitive components such as the magnetoresistive read/write transducer head in a disk drive suspension. The term "electrically isolated" and the like should therefore not be understood to denote infinite resistance (zero conductance), but should rather be understood to mean electrically isolated sufficiently to allow different signals to be effectively carried on the different signal paths, as will be understood within the field of electrical engineering.

It will be understood that terms such as "approximately," "about" and "substantially" as used within the specification and the claims herein allow for a certain amount of variation from any exact dimensions, measurements and arrangements, and that these terms should be understood within the context of the description and operation of the devices, systems, methods and so forth as disclosed herein.

It will further be understood that terms such as "top," "bottom," "above" and "below" as used in the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and/or described in the specification, upside down from that orientation or any other rotational variation.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

Accordingly, it will be evident from the foregoing detailed description that there are a number of changes, adaptations and modifications that come within the province of those skilled in the art. The scope of the disclosure includes any combination of the elements from the different species, embodiments, functions, sub-systems and/or subassemblies and methods of making and using them as disclosed herein, as would be within the skill of the art. For example, the flying lead arrangements disclosed in the Background section above can, for example, be adapted and used in any of the circuits, flexures, head suspension for hard disk drive systems, electrical interconnects, and/or suspension assemblies of this disclosure and/or manufactured and by any of the methods disclosed herein, as would be understood by those skilled in the art reading this disclosure. Similarly, the circuitries of this disclosure can be adapted and used in any of the flexures, head suspensions for hard disk drive systems, electrical interconnects, and/or suspension assemblies as disclosed in any of the patents, published applications and copending applications mentioned herein, as would be apparent to those skilled in the art. It will be understood that the term "copper" includes copper alloys. It will also be understood that although the illustrative embodiments have been disclosed with reference to stainless steel support layers, polyimide insulating layers, and copper signal conductors, other suitable materials can be substituted and the invention and the claims are not limited to any particular material except as the claims may recite those specific materials. Other materials can be used. It is intended that all such variations not departing from the spirit thereof be considered as within the scope of this disclosure.

What is claimed is:

1. A flexure for a disk drive, the flexure comprising:
  a supported region comprising:
    a support layer;
    an insulating layer on the support layer;
    a supported portion of a first signal conductor carrying a first signal, the supported portion being disposed over and supported by the insulating layer and the support layer;
    a supported portion of a second signal conductor carrying a second signal, the second signal conductor being disposed above the first signal conductor in a stacked arrangement and electrically separated therefrom by a second insulating layer;
  a flying lead region having:
    a first flying lead comprising an unsupported portion of said first signal conductor having no support layer underneath, the first flying lead being electrically continuous with the first signal conductor and defining a first signal path therewith;
    a second flying lead comprising an unsupported portion of said second signal conductor having no support layer underneath, the second flying lead being electrically continuous with the second signal conductor and defining a second signal path therewith;
  wherein:
    the unsupported portion of said first signal conductor is significantly thicker than the supported portion thereof; and
    the first and second signal paths travel in stacked fashion one on top of the other in the supported region, and travel side by side in the unsupported region.

2. The flexure of claim 1 wherein said unsupported portion of said first signal conductor is at least 50% thicker than the supported portion thereof.

3. The flexure of claim 1 wherein the first and second signal conductors in the supported region of the flexure are each integral with and electrically connected to the flying lead, the flying lead having a thickness that is approximately the sum of respective thicknesses of the first and second signal conductors.

4. The flexure of claim 1 wherein exactly one of the first and second signal conductors in the supported region of the flexure is integral with the flying lead, and the first and second conductors in the supported region are electrically isolated from each other and carry different signals.

5. The flexure of claim 1 wherein the supported region defines a first supported region, and wherein the flexure further comprises:
  a second supported region, the second supported region comprising third and fourth signal conductors that are electrically continuous with the first and second flying leads, respectively, the third and fourth signal conductors being vertically stacked in the second supported region, the second supported region being on an opposite side of the flying lead region as the first supported region.

6. The flexure of claim 1 wherein at least one of the flying leads is electrically connected to its respective signal conductor in the supported region by a crossbar and a vertical via connecting together two separately deposited plating layers.

7. The flexure of claim 1 wherein exactly one of the first and second signal conductors in the supported region of the flexure is integral with the flying lead, and the first and second conductors in the supported region are electrically isolated from one another and carry opposite polarities of a single differential signal.

8. The flexure of claim 7 wherein:
the flying lead defines a first flying lead;
the flying lead region further comprises a second flying lead;
the first flying lead is electrically continuous with the first signal conductor; and
the second flying lead is electrically continuous with the second signal conductor;
whereby the two opposite polarities of the differential signal travel in stacked fashion one on top of the other in the supported region, and travel side by side in the unsupported region.

9. The flexure of claim 8 wherein the second flying lead is at least 50% thicker than the second signal conductor.

10. The flexure of claim 8 wherein the first flying lead and the second flying lead each have a thickness that is approximately equal to the sum of thicknesses of the first and second signal conductors.

11. The flexure of claim 10 wherein the first and second fly leads are each approximately twice as thick as each of the first and second signal conductors.

12. The flexure of claim 8 wherein the support layer defines a ground plane, such that the two opposite polarities of the differential signal travel in stacked fashion one on top of the other over a ground plane in the supported region.

13. A multi-layer flexure for a disk drive, the flexure comprising:
an electrical circuit having a flying lead region and a non-flying lead region;
a flying lead extending across the flying lead region;
the flying lead being formed by a top plating layer directly adjacent and on top of a bottom plating layer;
wherein the electrical circuit has a stacked trace construction in the non-flying lead region; and
the stacked trace construction includes a first trace formed by the bottom plating layer, a second trace formed by the top plating layer and stacked on the first trace, and a dielectric layer between the first and second traces.

14. The flexure of claim 13 wherein the flying lead has a thickness of approximately 10-12 μm, and the first and second traces each of a thickness of approximately 5-6 μm.

15. The flexure of claim 13 further comprising a dielectric layer between the first trace and the support layer below the first trace.

16. The flexure of claim 15 wherein the support layer is a stainless steel foil and the dielectric layer is a polyimide layer.

17. A multi-layer flexure for a disk drive, the flexure comprising:
an electrical circuit having a flying lead region and a non-flying lead region;
a flying lead extending across the flying lead region;
the flying lead being formed by a top plating layer disposed over a bottom plating layer;
wherein:
the electrical circuit has a stacked trace arrangement in the non-flying lead region; and
the stacked trace arrangement includes a first trace formed by the bottom plating layer, a second trace formed by the top plating layer and stacked on the first trace, and a dielectric layer between the first and second traces.

18. The multi-layer flexure of claim 17 wherein paths of the first and second traces diverge by a crossbar and a vertical via connecting together two separately deposited plating layers.

19. A multi-layer flexure for a disk drive, the flexure comprising an electrical circuit having:
a stacked and supported region, the stacked and supported region comprising:
a spring metal layer;
a first signal conductor and a second signal conductor disposed over the first signal conductor in a stacked configuration therewith, the first and second signal conductors also being disposed over the spring metal layer; and
a flying lead region having no supporting spring metal layer and having first and second flying leads, the first flying lead being electrically continuous with the first signal conductor and the second flying lead being electrically continuous with the second signal conductor, the first and second flying leads extending in parallel in the flying lead region;
the first signal conductor together with the first flying lead defining a first signal path;
the second signal conductor together with the second flying lead defining a second signal path;
whereby the first and second signal paths travel over one another in a stacked configuration in the supported region, and travel in parallel in the flying lead region.

20. The multi-layer flexure of claim 19 wherein the first and second flying leads are significantly thicker than the first and second signal conductors, respectively.

21. The multi-layer flexure of claim 19 wherein the first and second signal conductors carry opposite polarities of a differential signal, whereby said opposite polarities of said differential signal extend one on top of another in the stacked and supported region and extend parallel to one another in the flying lead region.

22. The multi-layer flexure of claim 19 wherein the first and second signal conductors carry different electrical signals, whereby said different electrical signals extend one on top of another in the stacked and supported region and extend parallel to one another in the flying lead region.

23. The multi-layer flexure of claim 19 wherein:
in the supported and stacked region, the first signal conductor defines a bottom signal conductor and the second signal conductor disposed over the first signal conductor defines a top signal conductor;
the lower signal conductor comprises a first part of a bottom electroplated layer;
the upper signal conductor was deposited as a first part of a top electroplated layer;
the first flying lead comprises a second part of the top electroplated layer deposited on a second part of the bottom electroplated layer; and
the second flying lead comprises a third part of the top electroplated layer deposited on a third part of the bottom electroplated layer.

24. The multi-layer flexure of claim 23 wherein each of the first and second flying leads has a thickness that is equal to a sum of the thickness of the top and bottom electroplated layers.

25. The multi-layer flexure of claim 19 wherein in the supported and stacked region, paths of the first and second signal conductors diverge by a crossbar and a vertical via connecting together two separately deposited plating layers.

26. The multi-layer flexure of claim 19 wherein each of the first and second flying leads has a thickness that is equal to a sum of the thickness of the first and second signal conductors.

* * * * *